INVENTOR
FREDRIC E. FLADER
FRANK LAKOWITZ
BY FREDERICK STEEL
ATTORNEY

June 17, 1947.　　　F. E. FLADER ET AL　　　2,422,296
SLAT AND FLAP CONTROL SYSTEM
Filed Aug. 22, 1941　　　2 Sheets-Sheet 2

INVENTOR
FREDRIC E. FLADER
BY FRANK LAKOWITZ
FREDERICK STEEL
ATTORNEY

Patented June 17, 1947

2,422,296

UNITED STATES PATENT OFFICE 2,422,296

SLAT AND FLAP CONTROL SYSTEM

Fredric E. Flader, Kenmore, Frank Lakowitz, Tonawanda, and Frederick Steele, Kenmore, N. Y., assignors to Curtiss-Wright Corporation, a corporation of Delaware Application August 22, 1941, Serial No. 407,894

4 Claims. (Cl. 244—42)

This invention relates to hydraulic control systems and is particularly concerned with systems for the control of aircraft components such as wing slats and flaps.

An object of the invention is to provide a hydraulic control system wherein there is a single hydraulic pump and at least two hydraulic motors which are sequentially operated in response to pump operation. A further object is to provide a control system for aircraft slats and flaps wherein the slats are first extended and the flaps subsequentially extended upon continued operation of an operating pump, a further object comprising the sequential retraction of flaps and slats in the order named when the pump is adjusted for retraction of these elements. A further object of the invention is to provide a novel valve organization which shall operate as a check valve for one range of pressure imposed thereon, and which shall operate as a free flow valve for another range of pressure imposed thereon.

A further object of the invention is to provide unitary means for operating aircraft control surfaces sequentially, and an associated object is to provide means for operating control surfaces in a certain sequence in one direction and in a reversed sequence in the other direction, such sequences being secured automatically in response to the imposition of operating force on the control system. A further object is to provide improvements in check valves.

Further objects of the invention will become apparent in reading the annexed description in connection with the drawings, in which.

Figure 1:
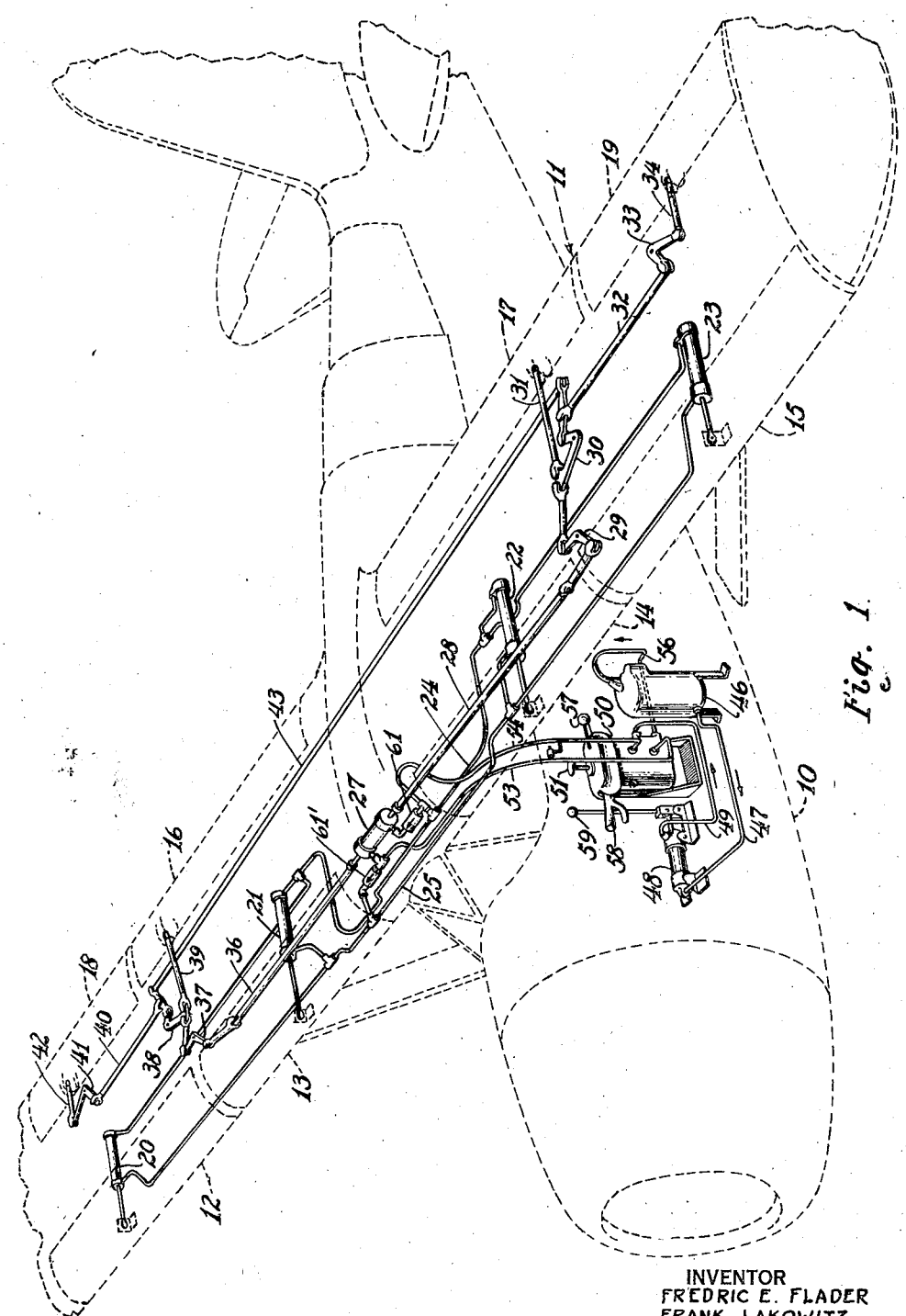
Fig. 1 is a perspective view of a portion of a hydraulic aircraft control system in association with an aircraft shown in dotted lines.
Figure 2:
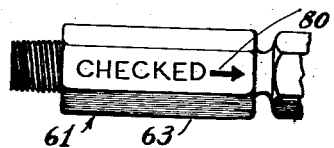
Fig. 2 is a side elevation of one of the check valve units used in the control system.

Referring first to Fig. 1, we show in dotted lines an aircraft comprising a fuselage 10 having a main wing 11 extending spanwise thereof. Said wing includes extendable slot forming slats 12, 13, 14, and 15 along the leading edge of the wing 11. The trailing edge of the wing is provided with trailing edge flaps 16 and 17 capable of being lowered for increment of wing lift and drag, and the wing trailing edge is likewise provided with ailerons 18 and 19 toward the wing tips which are likewise capable of being lowered, with the flaps 16 and 17, for increasing wing lift and drag.

The slats 12 to 15 and the flaps 16 to 19 are supported upon the wing 11 by means well known in the art and their extensive and retractive movements are accomplished hydraulically. As to the slats, piston-cylinder motors 20 to 23 inclusive are respectively provided for extending and retracting the slats 12 to 15, the pistons of these motors being linked to the slats, and the cylinders thereof being secured within the wing 11. The rear ends of the several cylinders are connected in parallel by a pipe 24, while the front ends of the cylinders are connected in parallel by a pipe 25.

All of the flaps 16 to 19 are jointly operated for extensive and retractive movements by a piston-cylinder motor 27 disposed within the wing, the cylinder thereof being secured to the wing and the piston rods thereof extending from both ends of the cylinder. A push-pull rod 28 is clevised to the lefthand end of the piston rod which in turn is connected through bell-cranks and linkage 29, 30, and 31 to the flap 17. The aileron 19 is also connected with this linkage through elements 32, 33, and 34. In somewhat the same manner but with the linkage disposed to give flap movements similar to the other flaps for opposite movement of the righthand piston rod, the flap 16 is controlled from the righthand end of the motor 27 through linkage 36, 37, 38, and 39, the righthand aileron being movable with and with respect to the flap 16 through additional linkage 40, 41, and 42. The ailerons 18 and 19 are connected to one another, at the bell-cranks 30 and 38, through a push-pull rod 43 joined with the links 32 and 40, whereby the ailerons, by extra control means, not shown, may be moved up and down oppositely regardless of their normal or lowered positions as controlled by the motor 27. In other words, all of the elements 16 to 19 inclusive, may be raised or lowered by operation of the motor 27 but regardless of the raised or lowered positions of the flap group as a whole, the ailerons 18 and 19 are always movable up and down with respect to each other for lateral control by the usual control stick connected to the push-pull rod 43. "Right" and "left" are considered as from the pilot's cockpit looking forward.

In the operation of the slat and flap system, it is desirable to be able to extend or retract the slats 12 to 15 without affecting the trailing edge flaps and, if extension of slats and flaps, both, is desired, it is desirable to extend the slats before the flaps are extended. Furthermore, in retractive movements, it is desirable to be able to retract the flaps before the slats are retracted.

To this end, the hydraulic operating system for the slats and flaps is arranged, as will become apparent, to attain the above outlined sequence of operative movements.

The hydraulic motive system for slat and flap operation, as well as for operating other hydraulically controlled devices, includes a fluid reservoir 46 whose lower end is connected to a pipe 47 to the intake side of a pump 48 which discharges through a pipe 49 to a unitary valve assembly 50 which may be adjusted by an appropriate control element such as 51 to direct pressure fluid either to the pipe 53 or to the pipe 54, which are connected respectively to the pipes 25 and 24 leading to the slat motors, and to opposite ends of the flap motor 27. Either pipe 53 or 54 not subjected to pump pressure is connected through the valve assembly 50 to a pipe 56 leading to the top of the reservoir 46. The valve unit 50 is shown with control handles 57 and 58 which may be used to direct fluid from the pump 48 to other hydraulically operated aircraft auxiliary such as landing gear and cowl flaps, not shown. The pump 48 is shown as being manually operable by means of a handle 59 but this pump may of course be power driven.

It will be apparent that all of the hydraulic motors 20 to 23, inclusive, and 27 are connected in parallel so that, except for special valves 61 and 61' in the system, all motors would operate concurrently. However, these valves afford means by which sequential operation of slats and flaps is established and their specific construction will be described shortly. One of these valves 61' is disposed between the righthand end of the flap motor 27 and the pipe 25 leading to the front ends of the slat motors, while the other valve 61 is disposed between the lefthand end of the flap motor 27 and both the supply pipe 54 and the pipe 24 leading to the back ends of the slat motors. The supply pipe 53 is connected directly to the righthand end of the flap motor 27.

Now referring to Figs. 2 to 5, it will be seen that each check valve unit 61 comprises a body 63 having a male screw connection 64 at one end and a female screw connection 65 at its other end. A ball 66 is disposed toward the end 64 and is urged toward the other end by a light spring 67, said ball being pressed by the spring against a seat 68 formed in a sleeve 69 axially slidable in the body. A calibrated spring 70 rests at its left end against the righthand end of the sleeve 69, and rests at its righthand end against a mandrel 71 loose in the valve body. Said mandrel has a counterbore 72 and cross holes 73 which serve to allow free flow of fluid from the body bore to the right of the sleeve 69, to the righthand valve body connection, which latter comprises an abutment for the mandrel 71. The mandrel likewise carries a pin 76 entering the hole in the sleeve 69 for a purpose which will become apparent shortly.

Figure 3:
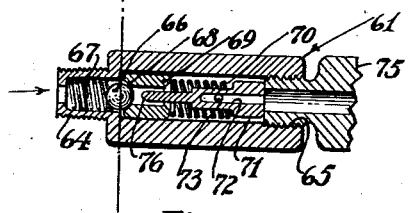
Figs. 3, 4, and 5 are longitudinal sections through the check valve showing the valve in different positions of adjustment.
Figure 4:
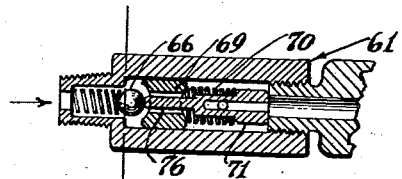

Referring now to Fig. 3 and assuming that fluid is applied to the lefthand end of the valve under a moderate pressure of, say, less than 100 p. s. i. (pounds per square inch), the ball 68 will seat upon the sleeve 69 and will prevent flow of fluid through the valve since the spring 70 is of sufficient stiffness to prevent movement of the sleeve 69 to the right. Referring now to Fig. 4, and assuming that fluid is applied to the lefthand end of the valve under an increased pressure of, say, 100 to 150 p. s. i., the sleeve 69 will move to the right under the influence of fluid pressure and will compress the spring 70 and will open a passage through the sleeve bore since the ball 68 is prevented from substantial movement to the right by its engagement with the end of the pin 76 on the mandrel 71. Thus, flow of fluid from left to right may occur through the valve body.

Figure 5:
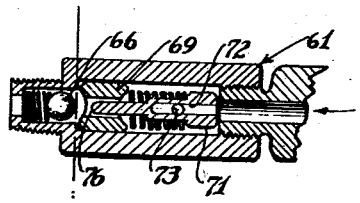

Now referring to Fig. 5, let it be assumed that fluid is applied to the righthand end of the valve at comparatively low (or any greater) pressure—less than 100 p. s. i. Fluid will flow through the counterbore 72 and holes 73, between the pin 76 and the sleeve 69 and will unseat the ball 68 from the sleeve against the action of the light positioning spring 67, thus permitting free flow of fluid through the valve body. It should be noted that the valve 61 is marked with an arrow 80 which indicates the direction in which moderate pressure is checked by the valve and in which high pressure is unchecked. Flow in the direction opposite to the arrow is free at all times.

Referring again to Fig. 1, the valve 61 associated with the supply line 54 will stop off fluid flow to the flap motor 27 until pressure in the line 54 exceeds the blow-off pressure of the valve. In manipulating the pump 48 for slat and flap extension from their normal wing positions, the slat motors are subjected to direct pump pressure and these will operate to extend the slats under moderate pressure conditions. While they are extending, admission of pressure fluid to the flap motor 27 is prevented by the valve 61. When the slat motors have been fully extended, further pumping will increase the pressure in the line 54 to an extent sufficient to allow flow of fluid through the valve 61 thus operating the flap motor for flap extension. While these extensive movements are taking place, hydraulic fluid may return from the front ends of the slat motors by reverse flow through the valve 61' to the supply line 53 and when the flap motor is extended, fluid from the righthand end thereof flows directly to the supply line 53.

When retraction of the slats and flaps to their normal wing positions is desired, the valve 50, 51 is adjusted in the proper manner and pumping is initiated which delivers fluid to the supply line 53 which, being directly connected to the righthand end of the flap motor 27 initiates flap retraction prior to slat retraction since the valve 61' will remain closed while the fluid pressure is relatively low. As soon as the flaps are retracted to their normal wing positions and pumping is continued, fluid pressure in the line 53 will build up, whereby the valve 61' will open and admit pressure fluid to the front ends of the slat motors to effect slat retraction. During retractive movements of the slats and flaps, fluid in the rear ends of the slat motors will flow directly to the supply line 54 and back to the reservoir and fluid from the lefthand end of the flap motor will flow reversely through the valve 61 to the supply line 54.

In the above description, where reference is made to the right and left hand ends of the flap motor, these directions are taken as if the reader were sitting in the normal position in the aircraft, facing forward. However, the use of the terms "right," "left," "forward" and "rearward," are not to be construed as limitations in the structure but rather as terms which are merely convenient for explanation of function of the system in the environment chosen for illustration.

It is considered that the interconnection of the several flaps and slats, as well as the hydraulic control system and the valves 61 comprise integral parts of the present invention.

While we have described our invention in detail in its present preferred embodiment, it will be obvious to those skilled in the art, after understanding our invention, that various changes and modifications may be made therein without departing from the spirit or scope theerof. We aim in the appended claims to cover all such modifications and changes.

We claim as our invention:

1. In an aircraft including a wing having an extendible slot-forming slat at its leading edge and a flap pivotally mounted at the wing trailing edge, a fluid motor operable in a first direction for extending said slat in a second direction for retracting said slat, a second fluid motor operable in a first direction for lowering the trailing edge of said flap and in a second direction for raising said flap trailing edge, a source of fluid pressure, fluid connections from said source to said motors, unitary means operable to control the direction of operation of both said motors by said fluid pressure, and means in said connections operative when said fluid motors are operated in their respective first directions to enforce, sequentially, operation of said first motor and then operation of said second motor and to enforce the reverse sequence when the motors are operated in their respective second directions.

2. In an aircraft, a body portion, wings extending oppositely from said body portion, said wings having extendible slot forming slats at their leading edge and ailerons pivotally mounted at their trailing edge, manually controllable motor mechanism comprising motor means operable for extending said slats and other motor means for lowering both ailerons, motor control means for automatically enforcing sequential operation of said slats and ailerons, said motor control means being effective to prevent joint lowering movement of both ailerons by said aileron operating motor means until said slat operating motor means reaches its limiting and complete slat-extending position, and means operable independently of said motor mechanism for oppositely adjusting said ailerons.

3. In an aircraft including a wing having a forwardly extendible slot-forming slat at its leading edge and a flap pivotally mounted at the wing trailing edge, manually controllable motor mechanism comprising motor means for extending said slat and other motor means for lowering said flap, and motor control means for automatically enforcing sequential operation of said slat and flap, said motor control means being effective to prevent flap lowering movement of said flap operating motor means until said slat operating motor means reaches its limiting and complete slat-extending position.

4. In an aircraft including a wing having a forwardly extendible slot-forming slat at its leading edge and a flap pivotally mounted at the wing trailing edge, manually controllable motor mechanism comprising motor means for extending and retracting said slat from and to its normal wing position and other motor means for lowering and raising said flap from and to its normal wing position, and motor control means for automatically enforcing sequential operation of said slat and flap, said motor control means being effective to prevent slat retracting movement of said slat operating motor means until said flap operating motor means raises said flap to its said limiting normal wing position.

FREDRIC E. FLADER.
FRANK LAKOWITZ.
FREDERICK STEELE.

REFERENCES CITED

The following references are of record in the file of this patent:

UNITED STATES PATENTS

| Number | Name | Date |
|---|---|---|
| 1,862,902 | McDonnell, Jr. | June 14, 1932 |
| 1,989,358 | Guthier | Jan. 29, 1935 |
| 2,000,666 | Osborn et al. | May 7, 1935 |
| 1,994,974 | Wiedmann | Mar. 19, 1935 |
| 2,250,389 | Miller | July 22, 1941 |
| 2,226,821 | Kempson | Dec. 31, 1940 |
| 1,806,379 | Wood | May 19, 1931 |
| 1,982,242 | Bellanca | Nov. 27, 1934 |
| 2,111,274 | Bellanca | Mar. 15, 1938 |

FOREIGN PATENTS

| Number | Country | Date |
|---|---|---|
| 289,517 | Great Britain | Apr. 25, 1928 |
| 496,609 | Great Britain | Dec. 2, 1938 |